United States Patent
Kazahaya et al.

(10) Patent No.: US 11,653,096 B2
(45) Date of Patent: May 16, 2023

(54) CALCULATION DEVICE, INTERCHANGEABLE LENS, CAMERA BODY, AND IMAGING DEVICE

(71) Applicant: NIKON CORPORATION, Tokyo (JP)

(72) Inventors: Satoshi Kazahaya, Yokohama (JP); Yuki Kinouchi, Yokohama (JP); Akihiko Obama, Tokyo (JP); Satoru Shibata, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 125 days.

(21) Appl. No.: 17/289,089

(22) PCT Filed: Oct. 28, 2019

(86) PCT No.: PCT/JP2019/042206
§ 371 (c)(1),
(2) Date: Mar. 10, 2022

(87) PCT Pub. No.: WO2020/090751
PCT Pub. Date: May 7, 2020

(65) Prior Publication Data
US 2022/0201215 A1    Jun. 23, 2022

(30) Foreign Application Priority Data

Oct. 29, 2018   (JP) .............................. JP2018-203100

(51) Int. Cl.
*H04N 5/232*   (2006.01)

(52) U.S. Cl.
CPC ..... *H04N 5/23287* (2013.01); *H04N 5/23209* (2013.01); *H04N 5/23258* (2013.01); *H04N 5/232122* (2018.08)

(58) Field of Classification Search
None
See application file for complete search history.

(56) References Cited

U.S. PATENT DOCUMENTS

2019/0215456 A1*   7/2019   Fukai ....................... G03B 3/10

FOREIGN PATENT DOCUMENTS

JP          2010-145494 A       7/2010

OTHER PUBLICATIONS

Jan. 7, 2020 International Search Report issued in International Patent Application No. PCT/JP2019/042206.

(Continued)

*Primary Examiner* — Cynthia Segura
(74) *Attorney, Agent, or Firm* — Oliff PLC

(57) ABSTRACT

A calculation device calculating an amount of movement in an optical axis direction of a focusing lens which adjusts a focal position of an imaging optical system includes: a first input unit to which first information about a deviation between an imaging surface which captures an image by the imaging optical system and the focal position is repeatedly input; a second input unit to which second information about a shake of the imaging optical system in the optical axis direction is repeatedly input at intervals shorter than those of the first information; and a calculation unit which calculates the amount of movement on the basis of at least one of the first information and the second information, wherein the calculation unit calculates the amount of movement on the basis of the second information between an input of the first information and an input of the next first information.

12 Claims, 7 Drawing Sheets

(56) References Cited

OTHER PUBLICATIONS

Jan. 7, 2020 Written Opinion issued in International Patent Application No. PCT/JP2019/042206.

* cited by examiner

US 11,653,096 B2

CALCULATION DEVICE, INTERCHANGEABLE LENS, CAMERA BODY, AND IMAGING DEVICE

TECHNICAL FIELD

The present invention relates to a calculation device, an interchangeable lens, a camera body, and an imaging device.

BACKGROUND

A technology for correcting a shake (focus shake) in an optical axis direction using an acceleration detection device that detects a shake in the optical axis direction is known (see Patent Document 1). In a conventional technology, shake correction in an optical axis direction has been performed only when a cumulative time of a focus detection imaging device exceeds a predetermined value.

RELATED ART DOCUMENTS

Patent Document

[Patent Document 1]
Japanese Unexamined Patent Application, First Publication No. 2010-145494

SUMMARY OF INVENTION

A calculation device according to a first aspect of the present invention is a calculation device which calculates an amount of movement in an optical axis direction of a focusing lens which adjusts a focal position of an imaging optical system and includes: a first input unit to which first information about a deviation between an imaging surface which captures an image by the imaging optical system and the focal position is repeatedly input; a second input unit to which second information about a shake of the imaging optical system in the optical axis direction is repeatedly input at intervals shorter than those of the first information; and a calculation unit which calculates the amount of movement based on at least one of the first information and the second information, in which the calculation unit calculates the amount of movement based on the second information between an input of the first information and an input of the next first information.

According to a second aspect of the present invention, an interchangeable lens includes the calculation device according to the first aspect; and the imaging optical system.

According to a third aspect of the present invention, a camera body includes: the calculation device according to the first aspect; and the imaging surface.

According to a fourth aspect of the present invention, an imaging device includes: the calculation device according to the first aspect; the imaging optical system; and the imaging surface.

DESCRIPTION OF EMBODIMENTS

Hereinafter, an embodiment for implementing the present invention will be described with reference to the drawings.

Figure 1:
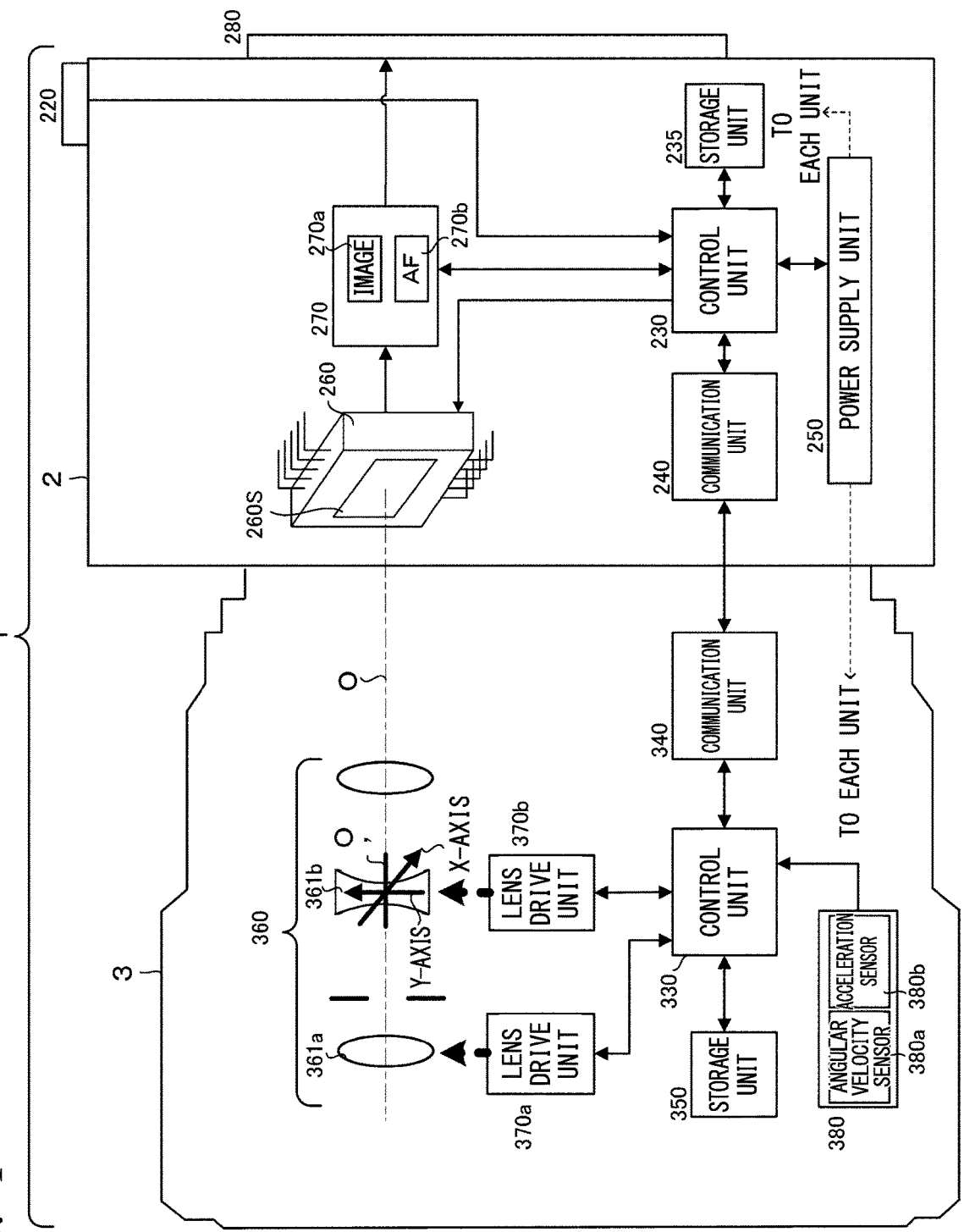
FIG. 1 is a block diagram illustrating a configuration of a main portion of a camera system.

FIG. 1 is a block diagram illustrating a configuration of a main portion of a camera system 1 in which a focus adjustment device according to one embodiment of the invention is mounted. In the camera system 1, an interchangeable lens 3 is detachably attached to a camera body 2. In FIG. 1, an optical axis O of the interchangeable lens 3, and an X-axis direction and a Y-axis direction in a plane intersecting the optical axis O are illustrated by lines.

Although FIG. 1 illustrates the camera system 1 of an interchangeable lens type, the camera system 1 may not be an interchangeable lens type. For example, the camera system 1 may be a camera or a video camera in which a camera body and a lens are integrated. Also, not limited to still images, the camera system 1 may be configured as an imaging device such as a video camera or a mobile camera that captures moving images.

<Camera Body>

The camera body 2 includes an operation member 220, a body side control unit 230, a body side storage unit 235, a body side communication unit 240, a power supply unit 250, an imaging device 260, a signal processing unit 270, and a display unit 280.

The imaging device 260 is a solid-state imaging device such as a CMOS image sensor or a CCD image sensor. The imaging device 260 captures an object image of the imaging surface 260S and outputs a signal thereof by a control signal from the body side control unit 230. In addition to capturing a still image, the imaging device 260 can capture a so-called through image (also referred to as a live view image) for continuously displaying an image formation state on the display unit 280.

The imaging device 260 includes a photoelectric conversion unit for image generation and a photoelectric conversion unit for focus detection. An imaging pixel signal generated by the photoelectric conversion unit for image generation is used for image generation by the image signal processing unit 270a of the signal processing unit 270. Also, a detecting pixel signal generated by the photoelectric conversion unit for focus detection is used by an AF signal processing unit 270b of the signal processing unit 270 for focus detection processing that detects an image formation state due to the interchangeable lens 3, in other words, a focus of the interchangeable lens 3. The imaging device 260 is connected to the signal processing unit 270 and the body side control unit 230.

The signal processing unit 270 includes the image signal processing unit 270a and the AF signal processing unit 270b. The image signal processing unit 270a performs predetermined image processing on the imaging pixel signal output from the imaging device 260 to generate an image. Generated image data is recorded in a storage medium (not shown) in a predetermined file format or used for image display by the display unit 280.

Also, the AF signal processing unit 270b performs focus detection processing such as a phase difference detection method or a contrast method using the detecting pixel signal output from the imaging device 260 to calculate an amount of defocus (an amount of deviation between an image formation position of the interchangeable lens 3 and the imaging surface 260S).

The signal processing unit 270 is connected to the body side control unit 230, the imaging device 260, and the display unit 280.

The body side communication unit 240 performs predetermined communication with a lens side communication unit 340. The body side communication unit 240 is connected to the body side control unit 230. An instruction to move a moving member (a focusing lens 361a or the like) included in an imaging optical system 360, an instruction to transmit information to the interchangeable lens 3, or the like is transmitted from the camera body 2 to the interchangeable lens 3 by a communication performed between the body side communication unit 240 and the lens side communication unit 340. In the interchangeable lens 3, position information of the above-described moving member, information read from a lens side storage unit 350, or the like is transmitted from the interchangeable lens 3 to the camera body 2 according to an information transmission instruction from the camera body 2.

The body side control unit 230 is configured with a microcomputer, peripheral circuits thereof, and the like. The body side control unit 230 executes a control program stored in the body side storage unit 235 to control each unit in the camera body 2. The body side control unit 230 is connected to the operation member 220, the body side storage unit 235, the body side communication unit 240, the power supply unit 250, the imaging device 260, and the signal processing unit 270.

The body side control unit 230 performs control of the entire camera body 2 such as image processing, focus control of the interchangeable lens 3, or the like. The body side control unit 230 calculates an amount of movement of the focusing lens 361a in an optical axis direction on the basis of the amount of defocus calculated by the signal processing unit 270b and a position information of the focusing lens 361a received from the interchangeable lens 3 by communication.

The body side control unit 230 further transmits the calculated amount of movement of the focusing lens 361a to the interchangeable lens 3 by the body side communication unit 240 as a movement instruction of the focusing lens 361a. The body side control unit 230 calculates an amount of movement of the focusing lens 361a and transmits a movement instruction to the interchangeable lens 3 each time the detecting pixel signal is output from the imaging device 260 and the AF signal processing unit 270b calculates an amount of defocus. For example, during through image capturing, since the body side control unit 230 causes accumulation of electric charge at the imaging device 260 in a predetermined cycle, the output of the detecting pixel signal and the calculation of the amount of defocus are also performed at the same cycle. Also, the body side control unit 230 creates a movement instruction on the basis of the amount of defocus calculated at the predetermined cycle and the position information of the focusing lens 361a that is repeatedly received from the interchangeable lens 3 in a shorter cycle. Therefore, during through image capturing, the body side control unit 230 causes the movement instruction of the focusing lens 361a to be transmitted to the interchangeable lens 3 on the basis of the electric charge accumulation cycle (frame rate).

The body side storage unit 235 stores a control program or the like executed by the body side control unit 230. In the body side storage unit 235, recording and reading of data are controlled by the body side control unit 230.

The power supply unit 250 converts a voltage of a battery (not illustrated) into a voltage used in each part of the camera system 1 to supply the converted voltage to each part of the camera body 2 and the interchangeable lens 3. The power supply unit 250 can switch on and off of the power supply for each power supply destination according to an instruction of the body side control unit 230.

The display unit 280 is configured by, for example, a liquid crystal display panel. The display unit 280 displays an image based on image data processed by the signal processing unit 270, an operation menu screen, or the like according to an instruction from the body side control unit 230.

Images displayed by the display unit 280 also include a reproduced image (still image or moving image) based on data of images recorded in the storage medium and the above-described through image. Further, setting of imaging conditions or the like may be performed using a touch panel operation of the display unit 280 instead of the operation member 220.

The operation member 220 including a release button, an operation switch, and the like is provided on an exterior surface of the camera body 2. The operation member 220 sends an operation signal according to an operation by a user to the body side control unit 230. The user performs an imaging instruction, a setting instruction of imaging conditions, or the like by operating the operation member 220.

The release button is configured so that a press-down operation in two stages including a half-press operation and a full-press operation is possible. The half-press operation refers to a press-down operation to an extent of up to half of a press-down amount at the time of the full-press operation. When the full-press operation is performed on the release button, an imaging instruction is given to the body side control unit 230, and data of an image captured by the imaging device 260 and generated by the image signal processing unit 270a is recorded in the storage medium (not shown).

Setting of imaging conditions refers to settings such as whether the image to be captured is a still image or a moving image, whether an exposure is automatically determined by the camera body 2 or a part or all of an aperture value, a shutter speed, and a sensitivity are determined by the user, and switching between an "S" mode and a "C" mode in an AF mode.

The "S" mode refers to an automatic focusing mode in which, when the release button is operated to be half-pressed and it is temporarily in focus, the focus is fixed while the half-press operation is kept. Also, the "C" mode refers to an automatic focusing mode in which a movement instruction of the focusing lens 361a is continued to be transmitted and focusing is continued while the release button is operated to be half-pressed.

<Interchangeable Lens>

The interchangeable lens 3 includes a lens side control unit 330, the lens side communication unit 340, the lens side storage unit 350, the imaging optical system 360, lens drive units 370, and a shake sensor 380.

The lens side control unit 330 is configured with a microcomputer, peripheral circuits thereof, and the like. The lens side control unit 330 executes a control program stored in the lens side storage unit 350 to control each unit in the interchangeable lens 3. The lens side control unit 330 moves the focusing lens 361a using a lens drive unit 370a on the basis of, for example, an amount of movement of the focusing lens 361a instructed from the camera body 2 by communication.

Also, the lens side control unit 330 calculates an amount of movement of a shake correction lens 361b on the basis of an amount of shake detected by the shake sensor 380 and a position of the shake correction lens 361b detected by a lens drive unit 370b. Then, the shake correction lens 361b is moved by the lens drive unit 370b on the basis of the calculated amount of movement of the shake correction lens 361b. The lens side control unit 330 is directly or indirectly connected to the lens side communication unit 340, the lens side storage unit 350, the lens drive units 370, and the shake sensor 380.

The lens side storage unit 350 is constituted by a non-volatile storage medium. In the lens side storage unit 350, recording and reading of data are controlled by the lens side control unit 330. The lens side storage unit 350 can store information on the interchangeable lens 3 in addition to storing a control program or the like executed by the lens side control unit 330.

The imaging optical system 360 forms an object image on an image formation surface (imaging surface 260S). The optical axis O of the imaging optical system 360 substantially coincides with a center position of the imaging surface 260S. At least a part of the imaging optical system 360 is configured to be movable in a position in the interchangeable lens 3 as a moving member. The moving member includes the focusing lens 361a and a shake correction lens 361b.

The lens drive units 370 move the moving members and include the lens drive unit 370a and the lens drive unit 370b. The lens drive units 370 each include an actuator, a drive mechanism, and a position detection unit of the moving member.

The focusing lens 361a is configured to be movable back and forth in the optical axis O direction by the lens drive unit 370a. When the focusing lens 361a moves, a focal position of the imaging optical system 360 is adjusted. A moving direction, an amount of movement, a moving speed, or the like of the focusing lens 361a may be included in a movement instruction from the body side control unit 230 or may be determined by the lens side control unit 330 in consideration of the movement instruction from the body side control unit 230.

A position of the focusing lens 361a is configured to be detectable by a position detection unit (pulse signal of an encoder, a motor, or the like) of the lens drive unit 370a.

The lens drive unit 370a of the focusing lens 361a is preferably one having a stop accuracy finer than a resolution of the shake sensor 380 to be described later such as a stepping motor, a voice coil motor, or the like.

The shake correction lens 361b is configured to be movable back and forth in a direction intersecting the optical axis O (a direction having components in the X-axis direction and the Y-axis direction) by the lens drive unit 370b. When the shake correction lens 361b moves, a shake (image shake) of an object image on the imaging surface 260S is suppressed. A determination as to a moving direction, an amount of movement, a moving speed, or the like of the shake correction lens 361b may be performed by the lens side control unit 330, or a shake sensor may be provided in the camera body 2 so that the body side control unit 230 performs the determination on the basis of a shake detection signal from the shake sensor. The lens side control unit 330 can also give an instruction to move the shake correction lens 361b in consideration of an instruction from the body side control unit 230.

A position of the shake correction lens 361b is configured to be detectable by a Hall element or the like of the lens drive unit 370b.

The lens side communication unit 340 performs predetermined communication with the body side communication unit 240. The lens side communication unit 340 is connected to the lens side control unit 330. A communication content thereof is as described with respect to the body side communication unit 240.

The shake sensor 380 detects a shake of the camera system 1 due to a camera shake or the like. The shake sensor 380 includes an angular velocity sensor 380a and an acceleration sensor 380b. The shake sensor 380 can detect an angular shake and a translational shake separately for an X-axis direction component, a Y-axis direction component, and a Z-axis direction component.

The angular velocity sensor 380a detects an angular velocity generated due to a rotational motion of the camera body 2. The angular velocity sensor 380a detects rotation around each axis of, for example, an axis parallel to the X axis, an axis parallel to the Y axis, and an axis parallel to the Z axis (optical axis O) and outputs each of the detection signals thereof to the body side control unit 230. Further, the rotation detection around the axis parallel to the Z axis may be omitted.

Also, the acceleration sensor 380b detects acceleration generated due to a translational motion of the camera body 2. The acceleration sensor 380b detects acceleration of, for example, the axis parallel to the X axis, the axis parallel to the Y axis, and the axis (optical axis) O parallel to the Z axis and outputs each of the detection signals thereof to the lens side control unit 330.

<Flow of Focus Detection Processing>

Figure 2:
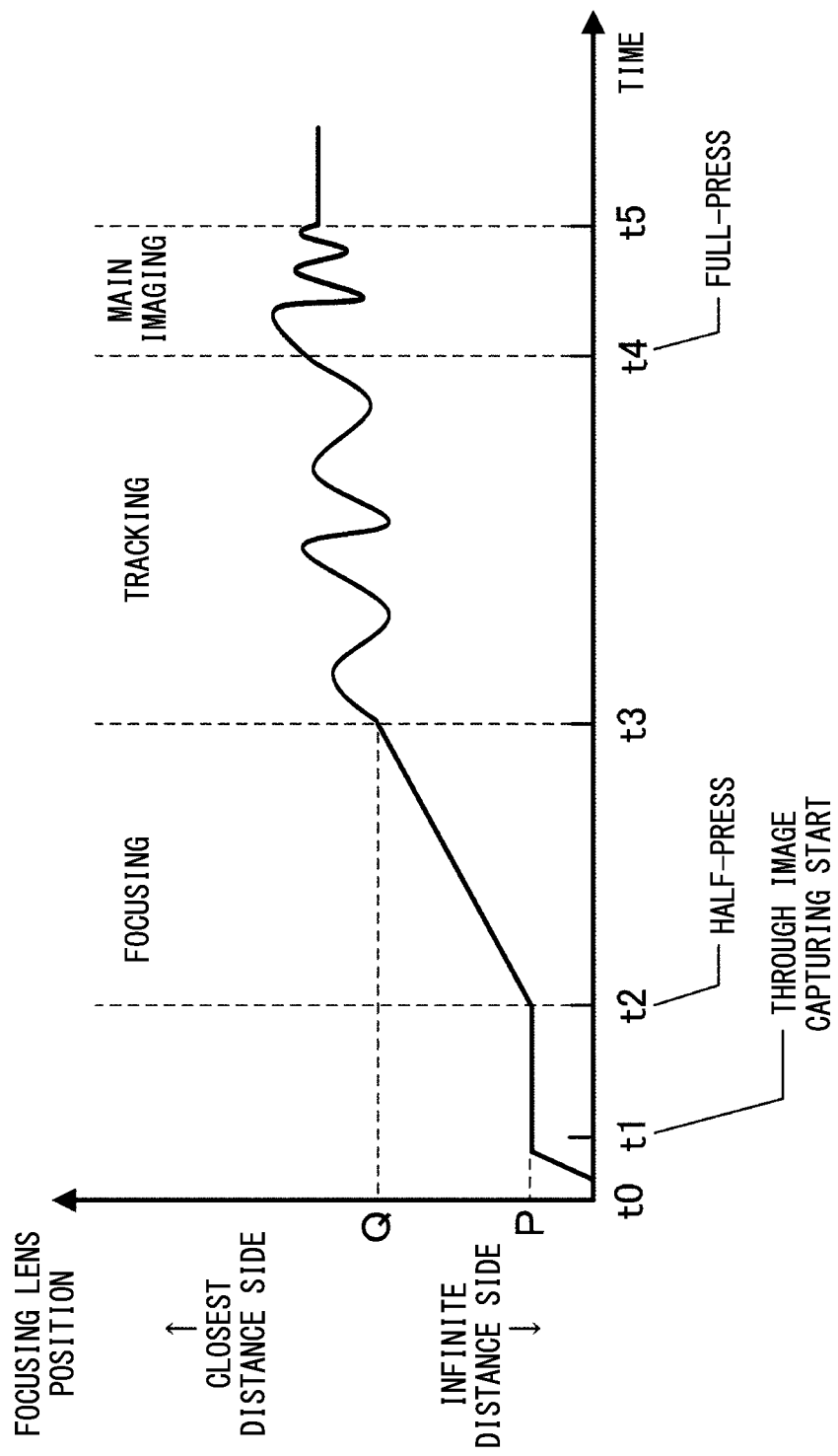
FIG. 2 is a diagram showing temporal change in a position of a focusing lens in an optical axis direction.

Focus detection processing by the camera system 1 will be described with reference to FIG. 2. FIG. 2 is a diagram showing a temporal change in a position of the focusing lens 361a in the optical axis O direction, with the horizontal axis representing time and the vertical axis representing a focusing lens position. It is assumed that the AF mode is set to the "C" mode.

The body side control unit 230 is configured to be activated when a main switch is operated to be turned on at time t0. Further, also when the operation member 280 has been operated to release a sleep operation, the body side control unit 230 is activated in the same manner as when the main switch is operated to be turned on.

The activated body side control unit 230 causes supply of power to be started from the power supply unit 250 to each unit of the camera system 1 to initialize each unit of the camera body 2. The lens side control unit 330 is activated when power is supplied from the power supply unit 250 to initialize each unit of the interchangeable lens 3. The initialization of the interchangeable lens 3 may include, for example, an operation of moving the focusing lens 361a to a predetermined initial position P.

At time t1 at which the initialization of each part of the camera system 1 is completed, the body side control unit 230 instructs the imaging device 260 to start through image capturing. When the imaging device 260 starts imaging under predetermined imaging conditions, the image signal processing unit 270a performs generation, display, an exposure calculation, or the like of a through image on the basis of an imaging pixel signal output from the imaging device 260, and the AF signal processing unit 270b performs focus detection processing on the basis of a detecting pixel signal output from the imaging device 260 to calculate an amount of defocus.

In the present embodiment, the imaging device 260 is repeatedly caused to perform imaging at a timing in synchronization with a frame rate of a through image display from the time t1 at which the through image capturing is started to a time t4 at which the release button is operated to be fully pressed. Then, the image signal processing unit 270a repeatedly performs generation, display, and an exposure calculation of the through image on the basis of the imaging pixel signal output from the imaging device 260, and the AF signal processing unit 270b repeatedly performs calculation of an amount of defocus on the basis of the detecting pixel signal output from the imaging device 260. The exposure calculation result is used at the time of imaging a through image of the next frame or at the time of main imaging when the release button is operated to be fully pressed. Also, a movement instruction of the focusing lens 361a is transmitted on the basis of the calculated amount of defocus.

Further, an image quality of the through image displayed on the display unit 280 may be lower than an image quality of the image imaged and recorded when the release button is operated to be fully pressed.

When a half-press operation of the release button is started at time t2, the body side control unit 230 communicates with the lens side control unit 330 to instruct a movement of the focusing lens 361a. The lens side control unit 330 sends a drive signal to the lens drive unit 370a to move the focusing lens 361a to a target position Q. The target position Q is calculated by the body side control unit 230 or the lens side control unit 330 on the basis of, for example, the position P of the focusing lens 361a at the time when the detecting pixel signal has recently been acquired and the amount of defocus calculated using the detecting pixel signal. Further, the movement of the focusing lens 361a to the target position Q has been configured to start after the half-press operation but may also be configured to start when the through image capturing is started and the movement instruction of the focusing lens 361a is transmitted. Also, the half-press operation is continued until a full-press operation (time t4).

When the body side control unit 230 recognizes that the focusing lens 361a has reached the target position Q by communication with the interchangeable lens 3 at time t3, the body side control unit 230 instructs the lens side control unit 330 to start tracking. The tracking in the present embodiment refers to continuation of focusing on a main object in focus. Therefore, the body side control unit 230 continues to transmit the movement instruction of the focusing lens 361a, and the lens side control unit 330 moves the focusing lens 361a in the optical axis O direction on the basis of the movement instruction. In the present embodiment, such a tracking operation is repeated from the time t3 when it is recognized that the focusing lens 361a has reached the target position Q to the time t4 when the release button is operated to be fully pressed. Even when the focusing lens 361a reaches the target position Q, a focus position may be deviated from the imaging surface 260S due to a movement of the object in the optical axis O direction or a shake of the camera system 1 in the optical axis O direction, but according to the present embodiment, focusing can be continued by the tracking operation.

In the tracking from the time t3 to the time t4, in addition to the movement of the focusing lens 361a based on the amount of defocus, a movement of the focusing lens 361a based on a detection signal of the shake sensor 380 (shake correction in the optical axis O direction) is performed. The lens side control unit 330 determines a moving direction, an amount of movement, a moving speed of the focusing lens 361a on the basis of, for example, a detection signal of acceleration in the optical axis O direction detected by the shake sensor 380. On the basis of the determination results, the lens side control unit 330 sends a drive signal to the lens drive unit 370a to move the focusing lens 361a in the optical axis O direction. As a result, in addition to the movement of the focusing lens 361a based on the amount of defocus, the focusing lens 361a is moved on the basis of the detection signal of the acceleration, and thereby shake correction in the optical axis O direction can be performed and focusing on the main object can be continued.

Since the imaging by the imaging device 260 is performed at the timing in synchronization with the frame rate of the through image display (for example, 60 frames/second), the amount of defocus can be calculated at intervals of about 10 milliseconds. That is, the movement of the focusing lens 361a based on the amount of defocus can be performed at intervals of about 10 milliseconds. On the other hand, the detection of the acceleration in the optical axis O direction by the shake sensor 380 can be detected at intervals of, for example, about 1 millisecond regardless of the above-described frame rate. That is, the movement of the focusing lens 361a based on the acceleration detection signal can be performed at a shorter interval than the detection of the amount of defocus (for example, at intervals of 1/10 which is about 1 millisecond).

With the configuration as described above, in tracking from the time t3 to the time t4, in addition to moving the focusing lens 361a at intervals of about 1 millisecond on the basis of the acceleration detection signal, the focusing lens 361a moves on the basis of the amount of defocus when the amount of defocus using a phase difference method is calculated at intervals of about 10 milliseconds (electric charge accumulation interval for through image). Therefore, it is possible to improve trackability of focusing by performing the shake correction in the optical axis O direction compared to a case in which the focusing lens 361a is moved only on the basis of the amount of defocus.

When the release button is operated to be fully pressed at time t4, the body side control unit 230 instructs the imaging device 260 to perform main imaging. The imaging device 260 performs the main imaging under imaging conditions, for example, based on a recent exposure calculation result calculated during a display of the through image. The body side control unit 230 during the main imaging instructs the lens side control unit 330 to start the shake correction in the optical axis O direction according to an exposure time or the like. Alternatively, the body side control unit 230 transmits the exposure calculation result or the like to the lens side control unit 330, and the lens side control unit 330 starts the shake correction in the optical axis O direction as necessary.

In tracking from the time t4 to a time t5, only the movement of the focusing lens 361a based on the above-described detection signal of the shake sensor 380 is performed. That is, the movement of the focusing lens 361a based on the acceleration detection signal is performed at intervals of about 1 millisecond. With such a configuration, focusing on the main object can be continued by performing the shake correction in the optical axis O direction even during the main imaging in which the amount of defocus is not calculated.

At the time t5, the body side control unit 230 causes the imaging device 260 to end the main imaging. Thereby, the image signal processing unit 270a generates an image for recording on the basis of the imaging pixel signal output from the imaging device 260. At this time, the body side control unit 230 may instruct the lens side control unit 330 to end the main imaging. The lens side control unit 330 may temporarily end the focus shake correction according to the end of the main imaging or may continue the acceleration detection to continue the focus shake correction.

Figure 3:
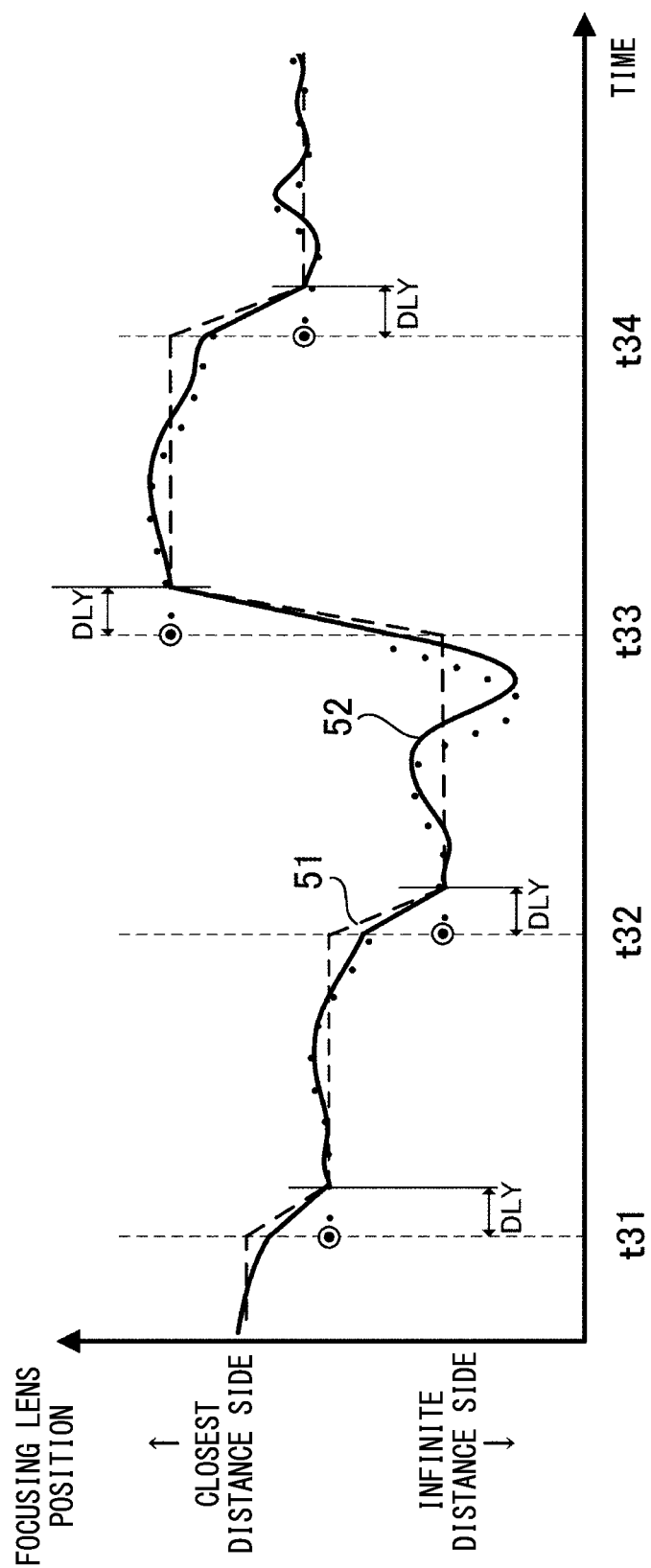
FIG. 3 is an enlarged view of a part of a waveform of FIG. 2.

FIG. 3 is an enlarged view of a part of a waveform during the tracking in FIG. 2, with the horizontal axis representing time and the vertical axis representing a focusing lens position. Times t31, t32, t33, and t34 are between the times t3 and t4 in FIG. 2, are timings at each of which the lens side control unit 330 that has received the movement instruction of the focusing lens 361a based on the amount of defocus from the body side control unit 230 outputs a drive signal to the lens drive unit 370a, and are in synchronization with the above-described frame rate.

The double circles shown at the times t31, t32, t33, and t34 are target positions of the focusing lens 361a based on the amount of defocus calculated by the body side control unit 230 in synchronization with the above-described frame rate and are referred to as first target positions. Even if the object is temporarily in focus, when the object moves in the optical axis O direction or the camera system 1 shakes in the optical axis O direction, a focus position is deviated and an amount of defocus is generated. Therefore, the first target positions that are repeatedly calculated in synchronization with the frame rate are different from each other at the times t31, t32, t33, and t34.

When it is assumed that the focusing lens 361a is moved only on the basis of the first target positions, the focusing lens 361a follows a trajectory indicated by a broken line 51. Specifically, the focusing lens 361a reaches each of the first target positions after a delay time DLY from each of the times t31, t32, t33, and t34. The delay time DLY corresponds to a movement time from when the lens side control unit 330 outputs a drive signal to the lens drive unit 370a until the focusing lens 361a actually reaches the first target position and depends on a distance and a speed of the movement.

Black dots are target positions of the focusing lens 361a calculated by the lens side control unit 330 on the basis of the detection signal of the acceleration in the optical axis O direction detected by the shake sensor 380 and are referred to as second target positions. As described above, in the present embodiment, a movement of the focusing lens 361a based on the detection signal of the acceleration is performed in addition to a movement of the focusing lens 361a based on the amount of defocus. Therefore, the lens side control unit 330 moves the focusing lens 361a to the first target position and then further moves it toward the second target position. The lens side control unit 330 performs the shake correction in the optical axis O direction until a movement instruction based on the amount of defocus is received from the camera body 2, a movement to the first target position is completed, and a movement instruction based on the next amount of defocus is received.

When the focusing lens 361a is moved to the first target position and the second target position, the focusing lens 361a follows a trajectory indicated by a solid line 52. A deviation between the second target position and the solid line 52 corresponds to a movement time from when the lens side control unit 330 outputs a drive signal to the lens drive unit 370a until the focusing lens 361a actually reaches the second target position.

Further, when both the first target position and the second target position are calculated at the times t31, t32, t33, and t34, the lens side control unit 330 moves the focusing lens 361a with priority given to the first target position. Therefore, although the first target position and the second target position are configured to match at the times t31, t32, t33, and t34 in the present embodiment, when they do not match, the lens side control unit 330 moves the focusing lens 361a to the first target position. The lens side control unit 330 does not consider the second target position but considers the first target position from each of the times t31, t32, t33, and t34 until the delay time DLY has elapsed (until the focusing lens 361a moves to the first target position). Also, when the first target position and the second target position at the same time do not match, the lens side control unit 330 may use a difference therebetween as a correction value for a calculation of the subsequent second target position. Also, the lens side control unit 330 may calculate the second target position with the first target position as an origin. When an amount of movement of the focusing lens 361a based on the detection signal of acceleration is a relative amount, the lens side control unit 330 may update the origin for calculating the second target position every time the first target position is calculated.

According to FIG. 3, it is found that the solid line 52 in which the focusing lens 361a is further moved to the second target position has better trackability of focusing compared to the broken line 51 in which the focusing lens 361a is moved to the first target position only at the timing of the through image display.

<Explanation of Flowchart>

Figure 4:
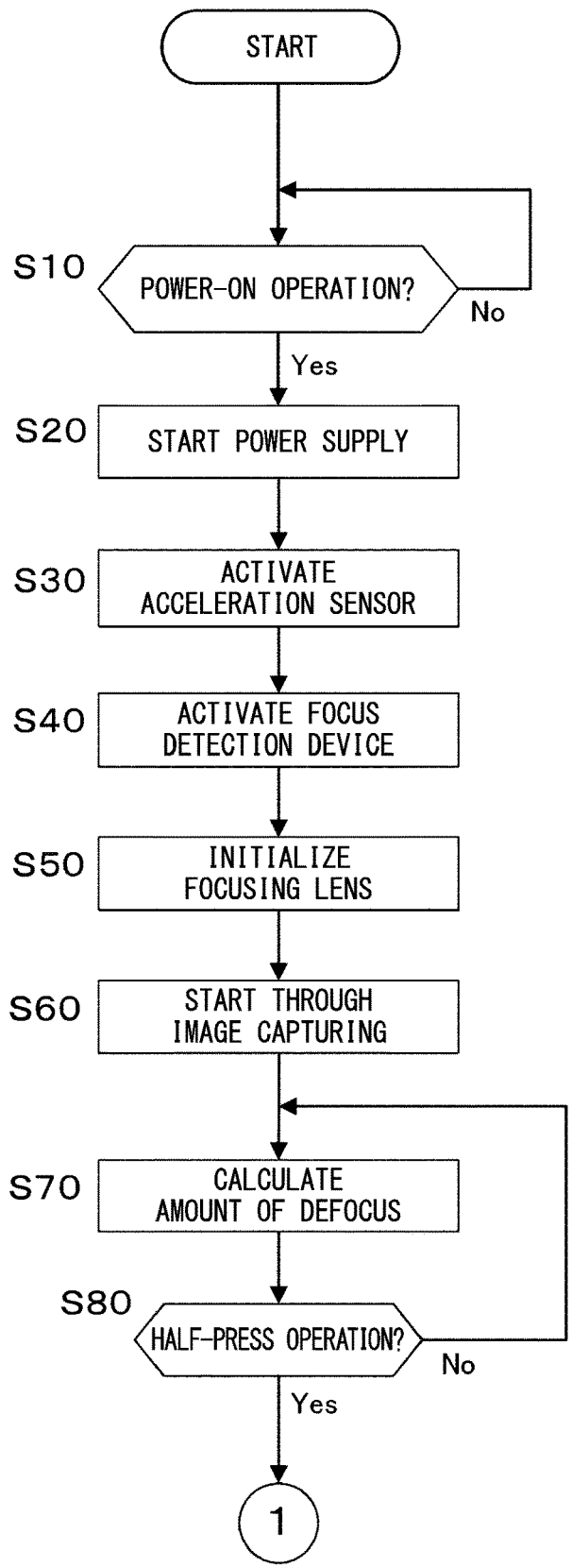
FIG. 4 is a flowchart for explaining a flow of processing performed by a camera system.

A flow of processing performed by the above-described camera system 1 will be described with reference to the flowcharts of FIGS. 4 and 5. In step S10 of FIG. 4, when a battery (not illustrated) is loaded in the camera body 2, the body side control unit 230 detects an operation of the main switch, which is one of the operation members 220, to determine whether or not an operation of power-on has been performed. When the operation of power-on is detected, the body side control unit 230 makes an affirmative determination in step S10 and the processing proceeds to step S20. When the operation of power-on is not detected, the body side control unit 230 makes a negative determination in step S10 and repeats the determination processing.

In step S20, the body side control unit 230 causes the power supply unit 250 to start supply of power to each unit of the camera system 1, and the processing proceeds to step S30. In step S30, the body side control unit 230 or the lens side control unit 330 instructs to activate the shake sensor 380 (the angular velocity sensor 380a and the acceleration sensor 380b) of the interchangeable lens 3. In step S40, the body side control unit 230 activates a focus detection device and the processing proceeds to step S50. The activation of the focus detection device may be, for example, an initial setting for the imaging device 260 or the signal processing unit 270. In step S50, the body side control unit 230 transmits an instruction to initialize the focusing lens 361a to the interchangeable lens 3. The initialization of the focusing lens 361a may be a movement to the initial position P after detecting an origin position or detection of a current position.

In step S60, the body side control unit 230 instructs the imaging device 260 to start through image capturing, and the processing proceeds to step S70. When the through image capturing is started, in step S70, the body side control unit 230 causes the image signal processing unit 270a to perform generation, display, an exposure calculation, or the like of the through image on the basis of the imaging pixel signal output from the imaging device 260 and causes the AF signal processing unit 270*b* to calculate an amount of defocus on the basis of the detecting pixel signal output from the imaging device 260.

The body side control unit 230 may transmit a movement instruction of the focusing lens 361*a* to the interchangeable lens 3 on the basis of the calculated amount of defocus. The interchangeable lens 3 may calculate a first target position (corresponding to the target position Q in FIG. 2) on the basis of the received movement instruction to move the focusing lens 361*a*.

In step S80, the body side control unit 230 determines whether or not the release button has been operated to be half-pressed. When the half-press operation has been performed, the body side control unit 230 makes an affirmative determination in step S80, and the processing proceeds to step S90 in FIG. 5. When the half-press operation has not been performed, the body side control unit 230 makes a negative determination in step S80, and the processing returns to step S70. The body side control unit 230 that has been returned to step S70 causes the image signal processing unit 270*a* to perform generation, display, an exposure calculation, or the like of the above-described through image on the basis of an imaging pixel signal newly output from the imaging device 260 and causes the AF signal processing unit 270*b* to calculate the above-described amount of defocus on the basis of a detecting pixel signal newly output from the imaging device 260.

Figure 5:
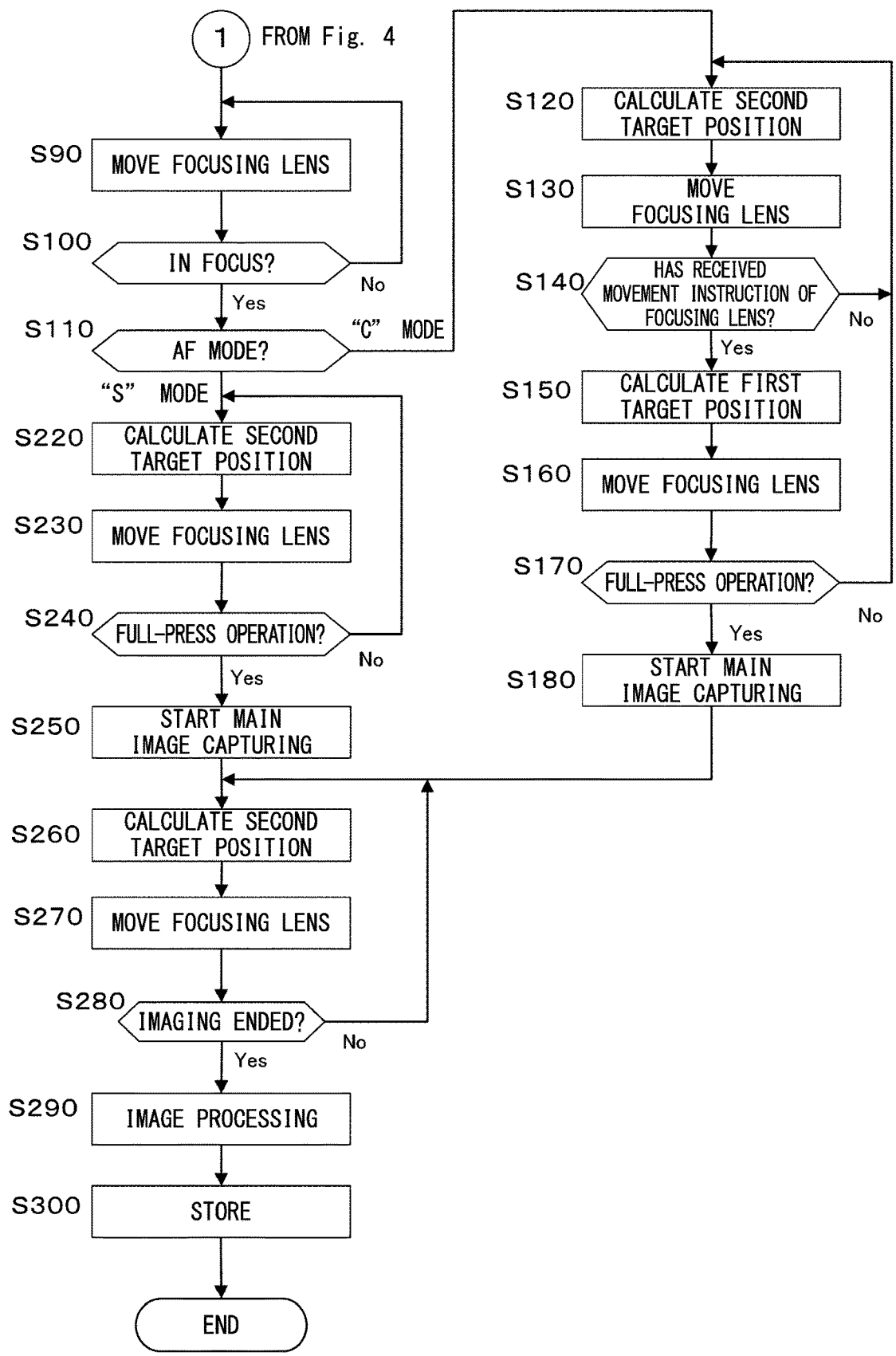
FIG. 5 is a flowchart for explaining a flow of processing performed by the camera system.

In step S90 of FIG. 5, the body side control unit 230 instructs the lens side control unit 330 to move the focusing lens 361*a*, and the processing proceeds to step S100. Thereby, the lens side control unit 330 sends a drive signal to the lens drive unit 370*a* to move the focusing lens 361*a* to the first target position.

In step S100, the body side control unit 230 determines whether or not it is in focus. For example, when the amount of defocus calculated from the newly output detecting pixel signal is within an allowable range, the body side control unit 230 makes an affirmative determination in step S100, and the processing proceeds to step S110. When the amount of defocus exceeds the allowable range, the body side control unit 230 makes a negative determination in step S100, returns to step S90, and performs the calculation of the amount of defocus and the focus determination at intervals on the basis of the frame rate.

In step S110, the body side control unit 230 determines whether the AF mode is the "S" mode or the "C" mode. When the AF mode has been set to the "C" mode, the body side control unit 230 transmits a tracking start instruction of the "C" mode to the interchangeable lens 3, and the processing proceeds to step S120. Also, when the AF mode has been set to the "S" mode, the body side control unit 230 transmits a tracking start instruction of the "S" mode to the interchangeable lens 3, and the processing proceeds to step S220.

The tracking in the "C" mode corresponds to the tracking from the time t3 to the time t4 described with reference to FIG. 2. In step S110, the body side control unit 230 sends an instruction to start shake correction in the optical axis O direction to the lens side control unit 330. Thereby, in step S120, the above-described second target position is calculated by the lens side control unit 330. In step S130, the lens side control unit 330 sends a drive signal to the lens drive unit 370*a* to move the focusing lens 361*a* to the second target position.

In step S140, the lens side control unit 330 determines whether or not the movement instruction of the focusing lens 361*a* based on the amount of defocus has been received from the camera body 2 after step S90. As described above, the calculation of the amount of defocus is performed about every 10 milliseconds (timing of the through image display). When the movement instruction of the focusing lens 361*a* has been newly received, the lens side control unit 330 makes an affirmative determination in step S140, and the processing proceeds to step S150. When the above-described movement instruction of the focusing lens 361*a* has not been newly received, the lens side control unit 330 makes a negative determination in step S140, and the processing returns to step S120. The lens side control unit 330 that has returned to step S120 repeatedly performs the movement of the focusing lens 361*a* (shake correction in the optical axis O direction) based on the acceleration detection signal in the optical axis O direction.

In step S150, the lens side control unit 330 calculates the first target position on the basis of the above-described movement instruction of the focusing lens 361*a*, and the processing proceeds to step S160. The first target position calculated in step S150 corresponds to the first target position shown in FIG. 3. In step S160, the lens side control unit 330 sends a drive signal to the lens drive unit 370*a* to move the focusing lens 361*a* to the first target position.

In step S170, the lens side control unit 330 determines whether or not the release button has been operated to be fully pressed and a signal for starting the main imaging has been received from the camera body 2. When the main imaging start signal has been received, the lens side control unit 330 makes an affirmative determination in step S170, and the processing proceeds to step S180. When the main imaging start signal has not been received, the lens side control unit 330 makes a negative determination in step S170, and the processing returns to step S120. The lens side control unit 330 that has returned to step S120 is caused to continue the tracking of the "C" mode described above.

In step S180, the body side control unit 230 instructs the imaging device 260 to start the main imaging. The imaging device 260 performs the main imaging under imaging conditions based on, for example, a recent exposure calculation result calculated during the display of the through image.

After the main imaging start signal is received, the lens side control unit 330 repeatedly performs the tracking from the time t4 to the time t5 described with reference to FIG. 2, in other words, the movement of the focusing lens 361*a* based on the acceleration detection signal in the optical axis O direction. Thereby, in step S260, the above-described second target position is calculated by the lens side control unit 330. In step S270, the lens side control unit 330 sends a drive signal to the lens drive unit 370*a* to move the focusing lens 361*a* to the second target position.

In step S280, the body side control unit 230 determines whether or not the main imaging has been completed. For example, when an exposure time of the imaging device 260 satisfies the exposure time set as the imaging condition of the main imaging, the body side control unit 230 transmits a main imaging completion signal indicating completion of the main imaging to the interchangeable lens 3 and makes an affirmative determination in step S280, and the processing proceeds to step S290. When the exposure time of the imaging device 260 does not satisfy the exposure time set as the imaging condition of the main imaging, the body side control unit 230 makes a negative determination in step S280, and the processing returns to step S260. The interchangeable lens 3 that has received the main imaging completion signal stops the shake correction in the optical axis O direction according to the AF mode. Therefore, the lens side control unit 330 continues the movement of the focusing lens 361a based on the acceleration detection signal in the optical axis O direction until the main imaging completion signal is received in step S280.

In step S290, the body side control unit 230 causes the image signal processing unit 270a to perform image processing on the imaging pixel signal output from the imaging device 260, and the processing proceeds to step S300. In step S300, the body side control unit 230 records image data after the image processing in a storage medium (not illustrated) in a predetermined file format and ends the processing according to FIG. 5.

The tracking in the "S" mode is the same as the tracking from the time t4 to the time t5 described with reference to FIG. 2. In the "S" mode, in step S110, the body side control unit 230 sends an instruction to the lens side control unit 330 to instruct tracking to move the focusing lens 361a based on the detection signal of the acceleration in the optical axis O direction. Thereby, in step S220, the above-described second target position is calculated by the lens side control unit 330. In step S230, the lens side control unit 330 sends a drive signal to the lens drive unit 370a to move the focusing lens 361a to the second target position.

In step S240, the lens side control unit 330 determines whether or not the release button has been operated to be fully pressed and a signal for starting the main imaging has been received from the camera body 2. When the main imaging start signal has been received, the lens side control unit 330 makes an affirmative determination in step S240, and the processing proceeds to step S250. When the main imaging start signal has not been received, the lens side control unit 330 makes a negative determination in step S240, and the processing returns to step S220. The lens side control unit 330 that has returned to step S220 is caused to continue the tracking in the "S" mode described above.

In step S250, the body side control unit 230 instructs the imaging device 260 to start the main imaging. The imaging device 260 performs the main imaging under imaging conditions based on, for example, a recent exposure calculation result calculated during the display of the through image. Since the processing after receiving the start signal of the main imaging is the same as the processing from step S260 to step S300 described above, description thereof will be omitted.

According to the above-described embodiment, the following effects can be obtained.

(1) Since the focus detection device of the present embodiment moves the focusing lens 361a using the first target position and the second target position, a focus shake is suppressed and an accuracy of focusing can be improved. Also, the focus detection device of the present embodiment moves the focusing lens 361a to the first target position when a movement instruction of the focusing lens 361a based on the amount of defocus has been received and moves the focusing lens 361a to the second target position when the movement instruction has not been received, and thereby shake correction in the optical axis O direction can be effectively performed.

(2) Since a time required for detecting first information (for example, about 10 milliseconds) is larger than a time required for detecting second information (for example, about 1 millisecond), focus adjustment for moving the focusing lens 361a to the first target position on the basis of the first information can be compensated by focus adjustment for moving the focusing lens 361a to the second target position on the basis of the second information.

(3) Since the body side control unit 230 calculates the amount of movement on the basis of the first information and not on the basis of the second information when the first information is input, when both the first information and the second information are input, the focus adjustment for moving the focusing lens 361a to the first target position on the basis of the first information can be preferentially performed.

(4) Since the AF signal processing unit 270b that detects a phase difference indicating a focus adjustment state due to the imaging optical system 360 to output it as the first information is provided, the focus adjustment for moving the focusing lens 361a to the first target position on the basis of the first information can be performed with high accuracy.

(5) Since the shake sensor 380 that detects at least a shake of the imaging optical system 360 in the optical axis O direction to output it as the second information is provided, an interval of the focus adjustment for moving the focusing lens 361a to the first target position on the basis of the first information can be compensated by the focus adjustment for moving the focusing lens 361a to the second target position on the basis of the shake in the optical axis O direction.

The following modifications are also within the scope of the present invention, and one or more of the modified examples can be combined with the above-described embodiment.

Modified Example 1

In the shake correction in the optical axis O direction, a limit may be provided on the amount of movement of the focusing lens 361a. For example, a predetermined threshold value for limiting the amount of movement of the focusing lens 361a that moves to the second target position in the shake correction in the optical axis O direction may be set. Also, the amount of movement of the focusing lens 361a that moves to the second target position in the shake correction in the optical axis O direction may be limited not to exceed an amount of movement of the focusing lens 361a that moves to the first target position, which is calculated on the basis of the movement instruction (amount of defocus) received from the camera body 2. Also, the amount of movement of the focusing lens 361a that moves to the second target position in the shake correction in the optical axis O direction may be limited not to exceed an amount of movement of the focusing lens 361a that moves to the first target position, which is calculated on the basis of at least one movement instruction that has been received before the above-described movement instruction.

Figure 6:
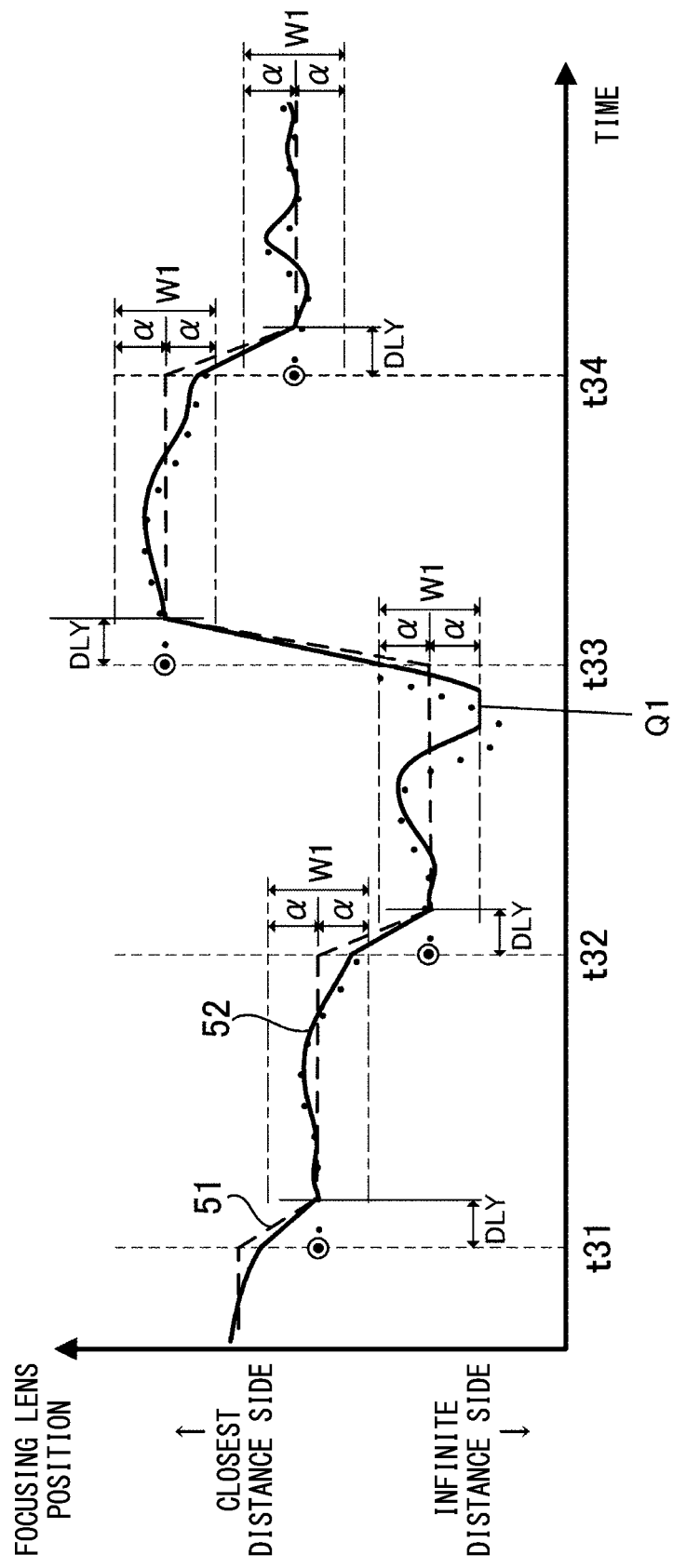
FIG. 6 is a diagram showing temporal change in a position of the focusing lens in the optical axis direction in modified example 1.

A limit value of the above-described amount of movement of the focusing lens 361a moving to the second target position may be set by multiplying the above-described amount of movement of the focusing lens 361a moving to the first target position by a coefficient. Also, the limit value of the above-described amount of movement of the focusing lens 361a moving to the second target position may be set according to a depth of a focus of the imaging optical system 360. FIG. 6 is a diagram showing a temporal change in a position of the focusing lens 361a in the optical axis direction in modified example 1 and is an enlarged view of a time zone similar to that in FIG. 3.

The lens side control unit 330 according to the modified example 1 limits the amount of movement of the focusing lens 361a that moves to the second target position not to exceed a predetermined range with the first target position as a center. Specifically, the amount of movement of the focusing lens 361a that moves to the second target position is limited to a range $\alpha$ (width W1=2$\alpha$) on each of a closest distance side and an infinite distance side with respect to the first target position calculated by the body side control unit 230.

For example, in the time from t32 to t33 in FIG. 6, the second target position indicated by a black dot exceeds the range α on the closest distance side from the first target position. The lens side control unit 330 limits the amount of movement of the focusing lens 361*a* when the second target position exceeds the range α to the above-described α. Thereby, the focusing lens 361*a* follows a trajectory indicated by the solid line 52, and as denoted by reference sign Q1, the amount of movement of the focusing lens 361*a* is limited to the range α on the closest distance side from the first target position.

The range α may be a value set by the lens side control unit 330. In FIG. 6, the lens side control unit 330 may be configured such that the range α is set as a fixed value while one half-press operation is continued (time t3 to t4), but the range α is changed each time the first target position is calculated. That is, the lens side control unit 330 may be configured such that the range α set at the time t31, the range α set at the time t32, the range α set at the time t33, and the range α set at the time t34 are made different from each other. Also, the range α may be set as a value according to a distance to the first target position. For example, since an amount of movement to the first target position at the time t33 is larger than an amount of movement to the first target position at the time t31, the range α between the times t33 and t34 may be set larger than the range α between the times t31 and t32.

Also, the range α may be made different between the half-press operation and the full-press operation. The lens side control unit 330 may set the range α during the full-press operation to be smaller than the range α during the half-press operation. Also, the lens side control unit 330 may perform the shake correction in the optical axis O direction even during the through image.

Also, the range α has been set on the closest distance side and the infinite distance side with the first target position as the center, but the range may be made different between the closest distance side and the infinite distance side.

Modified Example 2

Figure 7:
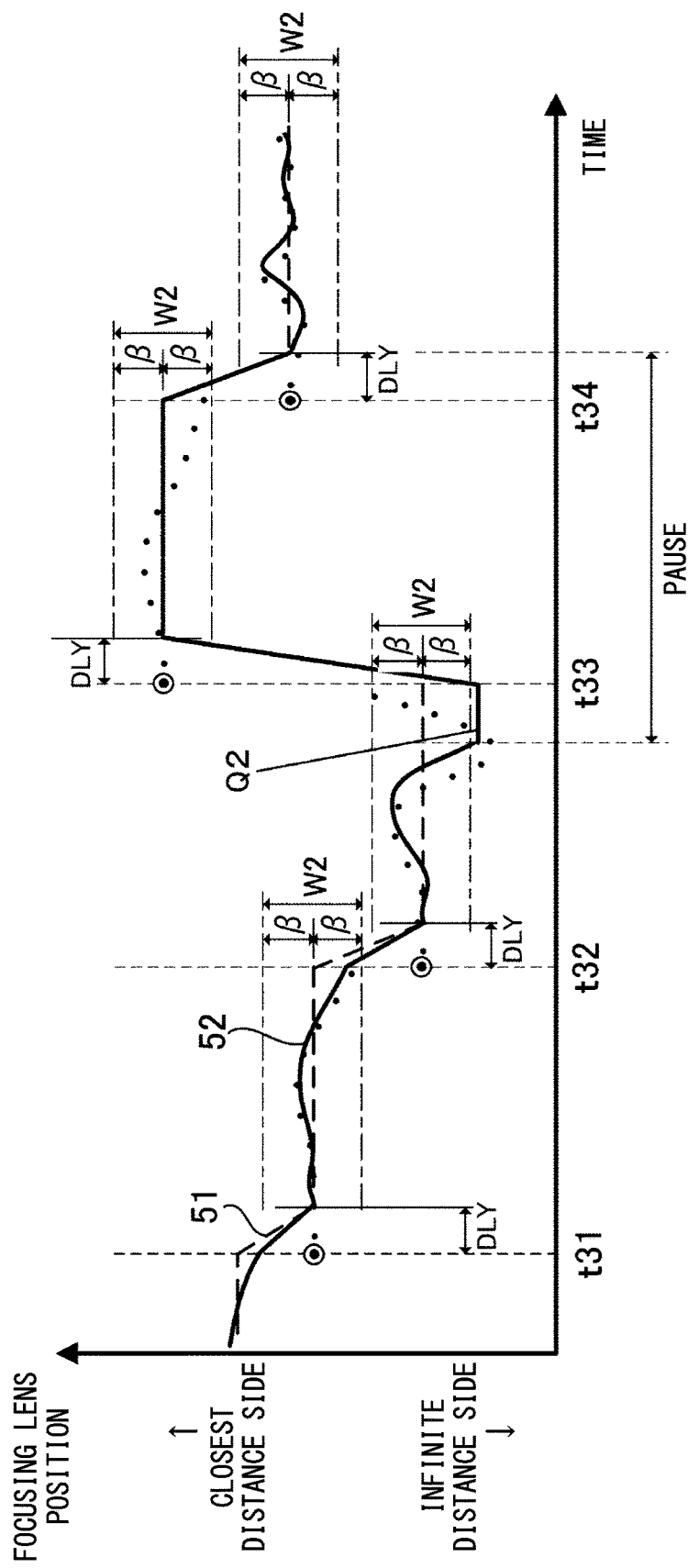
FIG. 7 is a diagram showing a temporal change in a position of the focusing lens in the optical axis direction in modified example 2.

FIG. 7 is a diagram showing a temporal change in a position of the focusing lens 361*a* in the optical axis direction in a modified example 2 and is an enlarged view of a time zone similar to that in FIG. 3.

When the second target position continues to exceed a range β (width W2=2β) on a closest distance side or an infinite distance side with respect to the first target position calculated by the body side control unit 230 a predetermined number of times, the lens-side control unit 330 according to the modified example 2 pauses the movement of the focusing lens 361*a* based on the acceleration detection signal and performs the movement of the focusing lens 361*a* based on the amount of defocus calculated by a phase difference method, in other words, the movement only to the first target position.

For example, in the time from t32 to t33 in FIG. 7, the second target position indicated by a black dot exceeds the range β on the closest distance side from the first target position twice in a row. When the second target position exceeds the range β twice in a row, the lens side control unit 330 pauses the movement of the focusing lens 361*a* to the second target position. This pause is continued, for example, until a detection result of the shake sensor 380 does not exceed the range β a predetermined number of times after the time t33 at which the next movement instruction is received after the pause.

In the case of FIG. 7, the second target position indicated by the black dot falls within the range β a plurality of times in the time from t33 to t34 in the next frame. Therefore, the lens side control unit 330 resumes the movement of the focusing lens 361*a* to the second target position at the time t34 at which the next movement instruction is received again. A time and conditions until the resuming can be changed as appropriate.

With such a configuration, the focusing lens 361*a* follows a trajectory indicated by the solid line 52, and as denoted by reference sign Q2, the amount of movement of the focusing lens 361*a* is limited not to be too far from the first target position calculated on the basis of a movement instruction received immediately before.

When the focusing lens 361*a* is moved to the second target position calculated on the basis of the second information, the lens side control unit 330 according to the modified example 1 and the modified example 2 described above limits the amount of movement not to exceed a predetermined range with the first target position calculated on the basis of the first information as the center (the range α or the range β on the closest distance side and the infinite distance side with respect to the first target position). With such a configuration, an interval of the focus adjustment for moving the focusing lens 361*a* to the first target position on the basis of the amount of defocus as the first information can be appropriately compensated by the focus adjustment for moving the focusing lens 361*a* to the second target position on the basis of the acceleration detection signal in the optical axis O direction as the second information.

Further, the movement range of the focusing lens 361*a* moving to the second target position and a center thereof may be calculated in consideration of a history of movement instructions. Also, a history of change in the first target position calculated on the basis of the movement instruction may be taken into consideration.

Modified Example 3

When a transmission cycle of the movement instruction from the camera body 2 is long, the lens side control unit 330 may be configured to perform shake correction in the optical axis O direction (movement to the second target position). When an F value (according to an opening diameter of an aperture member) is large or when a dark object is imaged, since it takes time for the imaging device 260 to accumulate electric charge, the shake correction in the optical axis O direction is effective.

Also, when a large shake in the optical axis O direction is detected, the lens side control unit 330 may determine that a composition has changed, such as when the object has moved, temporarily stop the movement to the second target position, and wait for calculation of the next first target position.

Modified Example 4

In the above-described embodiment, the first information that is the basis of the first target position is calculated by the body side control unit 230 and is input to the lens side control unit 330 that functions as a first input unit. Also, the above-described second information that is the basis of the second target position is input to the lens side control unit 330 that functions as a second input unit. That is, the amount of defocus has been calculated by the camera body 2, and the amount of movement of the focusing lens 361*a* based on the amount of defocus and the amount of movement of the focusing lens 361*a* based on the shake in the optical axis O direction have been calculated by the interchangeable lens 3, but these can be changed as appropriate.

For example, the amount of movement of the focusing lens 361*a* based on the amount of defocus may be calculated by the camera body 2, and the interchangeable lens 3 may finely adjust the amount of movement transmitted from the camera body 2.

Also, although the calculation of the amount of movement of the focusing lens 361*a* based on the shake in the optical axis O direction has been configured to be performed by the interchangeable lens 3, the calculation of the amount of movement of the focusing lens 361*a* based on the shake in the optical axis O direction may be performed by the camera body 2 side, and the amount of movement of the focusing lens 361*a* in consideration of both the amount of defocus and the shake in the optical axis O direction may be calculated by the camera body 2 side to be transmitted to the interchangeable lens 3. In that case, the shake sensor 380 may be provided in the camera body 2. Also, the shake sensor 380 may be configured to be disposed on both the camera body 2 side and the interchangeable lens 3 side.

Also, an example in which the shake sensor 380 functioning as the acceleration detection unit has a plurality of detection axes has been described, but the shake sensor 380 need only detect at least a shake in the optical axis O direction. Furthermore, an example in which the shake sensor 380 has a function of detecting an angular velocity has been described, but the shake sensor 380 need only detect at least acceleration in the optical axis O direction.

Further, the shake sensor 380 may be configured by a sensor other than a gyro sensor and an acceleration sensor.

Modified Example 5

Also, a configuration may be employed which is combined with a body side shake correction function that drives the imaging device so as to have a component in a direction perpendicular to the optical axis O. In that case, the imaging device can move in the X-axis direction and the Y-axis direction and also can rotate around the optical axis O. Also, by employing a configuration combined with the interchangeable lens 3 having the shake correction function, for example, a shake correction in the optical axis O direction is performed by the focusing lens 361*a*, shake correction around the optical axis O is performed by the imaging device, shake correction around the X-axis and around the Y-axis is performed by the shake correction lens 361*b*, shake correction in the X-axis direction and in the Y-axis direction is performed by the imaging device, and thereby, shake correction for six axes can be performed. Further, shake correction processing that performs image processing such that variation in a position of the object on the imaging surface 260S is reduced may be used in combination.

Although various embodiments and modified examples have been described above, the present invention is not limited to these contents. Other aspects conceivable within the scope of the technical idea of the present invention are also included within the scope of the present invention.

The contents disclosed in the following priority basic application is incorporated herein by reference.

Japanese Patent Application No. 2018-203100 (filed on Oct. 29, 2018)

DESCRIPTION OF THE REFERENCE SYMBOLS

1 Camera system
2 Camera body
3 Interchangeable lens
230 Body side control unit
260 Imaging device
270*b* AF signal processing unit
330 Lens side control unit
360 Imaging optical system
361*a* Focusing lens
O Optical axis

What is claimed is:

1. A calculation device calculating an amount of movement in an optical axis direction of a focusing lens which adjusts a focal position of an imaging optical system, the calculation device comprising:
a first input unit to which first information about a deviation between an imaging surface which captures an image by the imaging optical system and the focal position is repeatedly input;
a second input unit to which second information about a shake of the imaging optical system in the optical axis direction is repeatedly input at intervals shorter than those of the first information; and
a calculation unit which calculates the amount of movement based on at least one of the first information and the second information, wherein
the calculation unit calculates the amount of movement based on the second information between an input of the first information and an input of the next first information.

2. The calculation device according to claim 1, wherein the first information is repeatedly input to the first input unit at intervals in accordance with an electric charge accumulation time on the imaging surface.

3. The calculation device according to claim 1, wherein the calculation unit calculates the amount of movement based on the first information and not based on the second information when the first information is input.

4. The calculation device according to claim 1, wherein an amount of defocus calculated by a phase difference detection method is input to the first input unit as the first information.

5. The calculation device according to claim 1, further comprising:
a second detection unit which detects at least the shake of the imaging optical system in the optical axis direction and outputs the shake as the second information.

6. The calculation device according to claim 1, wherein the calculation unit limits the amount of movement calculated based on the second information so as not to exceed a range in accordance with the amount of movement calculated based on the first information.

7. An interchangeable lens, comprising:
the calculation device according to claim 1; and
the imaging optical system.

8. The interchangeable lens according to claim 7, further comprising:
a focus drive unit which drives the focusing lens based on the amount of movement calculated by the calculation unit; and a shake correction drive unit which drives a shake correction lens different from the focusing lens, based on a shake in a direction perpendicular to an optical axis of the imaging optical system, so as to have a component in a direction perpendicular to the optical axis.

9. The interchangeable lens according to claim 8, wherein the focus drive unit corrects a shake in an O direction which is the optical axis direction, and the shake correction drive unit corrects a shake in an X direction perpendicular to the O direction and in a Y direction perpendicular to the X direction and the O direction.

10. A camera body, comprising:

the calculation device according to claim 1; and the imaging surface.

11. The camera body according to claim 10, further comprising:

a body side drive unit which drives the imaging surface so as to have a component in a direction perpendicular to an optical axis based on a position on the imaging surface of an object of which image is formed by the imaging optical system.

12. An imaging device, comprising:

the calculation device according to claim 1;

the imaging optical system; and the imaging surface.

* * * * *